United States Patent
Kazawa et al.

(10) Patent No.: US 9,177,118 B2
(45) Date of Patent: Nov. 3, 2015

(54) LICENSE MANAGEMENT METHOD AND CONTENT PROCESSING SYSTEM

(75) Inventors: Tsunehisa Kazawa, Tokyo (JP); Kenjiro Komaki, Saitama (JP); Akihiko Kusumoto, Foster City, CA (US); Kaoru Morishita, Tokyo (JP); Motoki Kobayashi, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1092 days.

(21) Appl. No.: 13/125,186

(22) PCT Filed: Apr. 22, 2010

(86) PCT No.: PCT/JP2010/002931
§ 371 (c)(1),
(2), (4) Date: Apr. 20, 2011

(87) PCT Pub. No.: WO2011/036825
PCT Pub. Date: Mar. 31, 2011

(65) Prior Publication Data
US 2012/0011069 A1    Jan. 12, 2012

(30) Foreign Application Priority Data
Sep. 28, 2009   (JP) .................................. 2009-222523

(51) Int. Cl.
*G06Q 99/00* (2006.01)
*G06F 21/10* (2013.01)
*G06Q 20/12* (2012.01)

(52) U.S. Cl.
CPC ............ *G06F 21/10* (2013.01); *G06Q 20/1235* (2013.01)

(58) Field of Classification Search
CPC .................................................. G06Q 20/1235
USPC ................................ 705/59, 50, 51; 463/1.29
See application file for complete search history.

(56) References Cited

U.S. PATENT DOCUMENTS

| 5,892,900 A * | 4/1999 | Ginter et al. ..................... 726/26 |
| 5,943,650 A | 8/1999 | Kanno |
| 6,584,450 B1 * | 6/2003 | Hastings et al. ............. 705/26.1 |

(Continued)

FOREIGN PATENT DOCUMENTS

| JP | 1166218 A | 6/1989 |
| JP | 2810033 B2 | 10/1998 |

(Continued)

OTHER PUBLICATIONS

Office Action for corresponding Japanese Application 2009-222523, dated Aug. 3, 2010.
Office Action for corresponding Japanese Application 2009-222523, dated Feb. 15, 2011.
International Search Report for corresponding PCT/JP2010/002931, dated Aug. 3, 2010.

(Continued)

*Primary Examiner* — James D Nigh
(74) *Attorney, Agent, or Firm* — Matthew B. Dernier, Esq.

(57) ABSTRACT

A content distribution system includes a content distribution server and a portable game terminal. The content distribution server retains a first license for comprehensively permitting the use of multiple digital contents and issues to the portable game terminal a second license for individually permitting the use of a digital content selected by a user from among the multiple digital contents. The portable game terminal retains the second license and permits the use of the selected digital content if it is within the license period of the second license at the time.

7 Claims, 11 Drawing Sheets

(56) References Cited

U.S. PATENT DOCUMENTS

| | | | |
|---|---|---|---|
| 2002/0016775 A1 | 2/2002 | Nakagawa | |
| 2002/0154157 A1* | 10/2002 | Sherr et al. | 345/716 |
| 2008/0228513 A1* | 9/2008 | McMillan et al. | 705/1 |
| 2009/0210317 A1* | 8/2009 | Fox et al. | 705/26 |

FOREIGN PATENT DOCUMENTS

| | | | |
|---|---|---|---|
| JP | 2002024099 A | 1/2002 |
| JP | 2002373028 A | 12/2002 |
| JP | 2005250622 A | 9/2005 |
| JP | 2005284943 A | 10/2005 |

OTHER PUBLICATIONS

Ken-ichiro Ohta, "i-Mode Gensou (i-Mode Illusion)," Kieta Ima koso Manabe! Kateru! Keitai EC Kore ga Seikou Saito no Business Kouchiku-hou da, Nikkei NetBusiness,(Japan: Nikkei Business Publications, Inc., Aug. 10, 2001), No. 80, p. 56-60.

Katsuo Ishida, "G-mode Co., Ltd. Distributes on Feb. 9 an Action RPG 'Ruby and Goddess's Sword' Featuring an Active Girl for i-Mode" [online article], GAME Watch, (Feb. 5, 2004 [searched on Jul. 23, 2010]), http://game.watch.impress.co.jp/docs/20040205/gmode.htm.

International Preliminary Report on Patentability and Written Opinion for corresponding PCT/JP2010/002931, dated Apr. 11, 2012.

* cited by examiner

FIG.3

| CONTENT GROUP ID | CONTENT ID | CONCURRENTLY PERMISSIBLE NUMBER | FEE | PERIOD |
|---|---|---|---|---|
| BASIC PACK 3 | ○○ GOLF<br>○○ SOCCER<br>○○ TENNIS<br>LEGEND OF ○○<br>.<br>. | 3 | 500 YEN | 30 DAYS |
| VALUE PACK 5 | ○○ GOLF<br>○○ SOCCER<br>○○ TENNIS<br>○○ HUNTER<br>EVERYBODY'S ○○<br>LEGEND OF ○○<br>.<br>. | 5 | 700 YEN | 30 DAYS |

| USER ID | CONTENT GROUP ID | GROUP STARTING DATE AND TIME | GROUP ENDING DATE AND TIME | CONTENT ID | INDIVIDUAL STARTING DATE AND TIME | INDIVIDUAL ENDING DATE AND TIME |
|---|---|---|---|---|---|---|
| USER A | BASIC PACK 3 | SEPTEMBER 30, 11:30 | OCTOBER 30, 11:30 | ○○SOCCER | SEPTEMBER 30, 2:20 | NOVEMBER 3, 11:30 |
| | | | | ○○GOLF | OCTOBER 7, 16:00 | NOVEMBER 3, 11:30 |
| USER B | BASIC PACK 3 | AUGUST 31, 11:30 | OCTOBER 30, 11:30 | ○○SOCCER | SEPTEMBER 3, 11:40 | OCTOBER 4, 11:30 |
| | | | | ○○TENNIS | SEPTEMBER 10, 17:10 | OCTOBER 4, 11:30 |
| | | | | ○○GOLF | SEPTEMBER 14, 20:50 | NOVEMBER 3, 11:30 |
| | | | | LEGEND OF○○ | OCTOBER 6, 2:05 | NOVEMBER 3, 11:30 |

26

| CONTENT ID | INDIVIDUAL ENDING DATE AND TIME | GROUP ENDING DATE AND TIME |
|---|---|---|
| ○○SOCCER | NOVEMBER 3, 11:30 | OCTOBER 30, 11:30 |
| ○○GOLF | NOVEMBER 3, 11:30 | OCTOBER 30, 11:30 |

52

LICENSE MANAGEMENT METHOD AND CONTENT PROCESSING SYSTEM

TECHNICAL FIELD

The present invention relates to a data processing technique, and particularly to a technique for managing a license for a digital content.

BACKGROUND ART

With the advancements in information and communications technology, there have been provided subscription services on the Internet, in which a fee is charged for the use of a music content or the like for a certain period of time.

Details of certain know systems and devices may be found in Japanese Patent Application Laid-open No. 2002-024099

In a subscription service, management of licenses for digital contents is important to allow a user to use a digital content for a certain period of time. However, there has not been proposed a satisfying method for managing licenses that is constructed in consideration of an environment where an information device of a user for using a digital content is placed and that improves the convenience of a subscription service.

The present invention has been made in view of such a problem, and a purpose thereof is to provide a technique for improving the convenience in a digital content subscription service.

SUMMARY OF INVENTION

To solve the problem above, a content processing system of an embodiment of the present invention comprises a license management apparatus, and a content processing apparatus being connected to or disconnected from the license management apparatus. The license management apparatus includes: a first license retaining unit configured to retain the information of a first license, which comprehensively permits the use of a plurality of digital contents and specifies the end point of a license period; and a second license issuing unit configured to issue to the content processing apparatus a second license, which individually permits the use of a digital content selected by a user from among a plurality of digital contents and specifies the end point of a license period in accordance with the end point of the license period specified by the first license. The content processing apparatus includes: a second license retaining unit configured to retain the information of a second license; and a content processing unit configured to determine whether or not to permit the use of a selected digital content with reference to the license period specified by the second license.

Another embodiment of the present invention is a license management method. The method comprises: a step of offering to a user a group of a plurality of digital contents as a unit for which a license is provided; a first management step of providing, when a user performs a predetermined procedure for requesting the use of an offered group, a license for the group to the user and managing the expiration date of the license in the center; and a second management step of managing, when the user uses a digital content belonging to a group, the expiration date of the license for the digital content on an information device of the user.

Optional combinations of the aforementioned constituting elements, and implementations of the invention in the form of apparatuses, methods, systems, programs, and recording media storing programs may also be practiced as additional modes of the present invention.

The present invention improves the convenience in a digital content subscription service.

BRIEF DESCRIPTION OF DRAWINGS

FIG. 3 is a diagram that shows a configuration of a content group table;

FIG. 4 is a diagram that shows a configuration of a group license table;

DESCRIPTION OF EMBODIMENTS(S)

Figure 1:
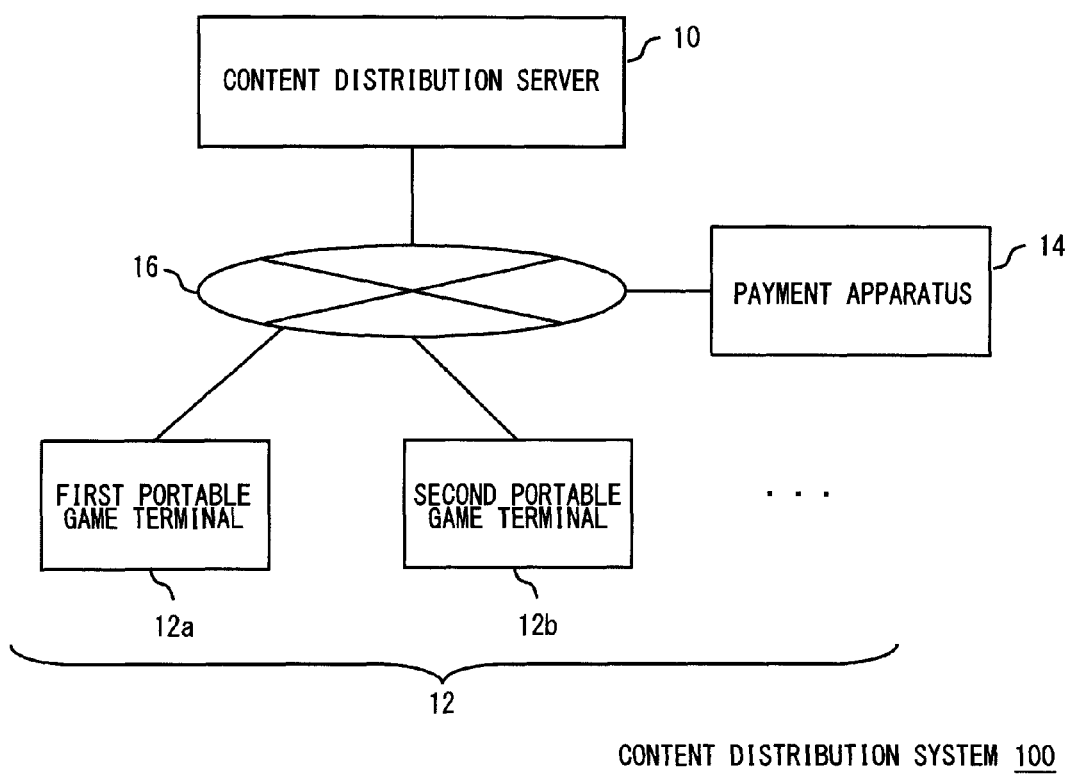
FIG. 1 is a diagram that shows a configuration of a content distribution system according to an embodiment of the present invention.

A general description will be given before the configuration of an embodiment of the present invention is described.

Development of a digital content may require a large amount of cost, and such cost is generally reflected in the sales price of the digital content; accordingly, the sales price of a digital content may sometimes soar. On the other hand, users desire to use digital contents inexpensively.

Therefore, there is provided a subscription service that allows a user to use a digital content inexpensively while the period of the use of the content is limited. The subscription service according to the present embodiment allows a user to use a certain number of digital contents or less among multiple digital contents at a fixed rate during a certain license period.

More specifically, the subscription service of the present embodiment may be a service that allows a user to arbitrarily select and enjoy three to five game titles in a game pack including 10 to 30 game titles, for example. Also, the service may provide a so-called "selective voucher" for a group including multiple digital contents. The group of multiple digital contents need not necessarily be provided permanently and may be provided for a certain period, such as a few months, or provided as a so-called "season pack". As a matter of course, a digital content included in a group may be occasionally changed with the passage of time, for example, while the name of the group remains unchanged.

There is an idea such that licenses for the subscription service should be desirably managed collectively by a license management center without troubling the users.

However, when a user uses a digital content, the user's terminal is not necessarily connected to a network and may be disconnected from the network, i.e., from the license management center.

Accordingly, the present embodiment proposes a content distribution system in which multiple digital contents are regarded as one group (hereinafter, also referred to as a "content group") and the use of the group is comprehensively permitted, and the license for which a fee is charged (hereinafter, also referred to as a "group license") is managed by the center. Meanwhile, a license for individually permitting the use of each of the multiple digital contents (hereinafter, also referred to as an "individual license") is managed by a user's terminal. The end point of the license period of an individual license is set to a date and time according to the end point of the license period of the group license.

According to this embodiment, even when a user's terminal is disconnected from a network, the terminal appropriately determines whether or not a digital content permitted by the subscription service can be used. Thus, the restriction placed on a user's terminal to use the subscription service can be reduced. Also, since a group license for which a fee is charged is managed by the center, automatic renewal of the group license can be facilitated. This allows a user to use the subscription service without regard to the payment of the service fee, thereby improving the convenience of the subscription service.

FIG. 1 shows a configuration of a content distribution system according to the embodiment of the present invention. The content distribution system 100 comprises a content distribution server 10, a first portable game terminal 12a and a second portable game terminal 12b, which are collectively referred to as portable game terminals 12, and a payment apparatus 14. Such components are connected to each other via a communication network 16, such as a LAN, a WAN, the Internet, and other publicly-known communication means.

The content distribution server 10 is an information processing apparatus for providing, to the user of a portable game terminal 12, an online store that is a website on which users can purchase digital contents and is accessible via the communication network 16. In response to a user's request received through the online store, the content distribution server 10 issues and manages a group license, issues an individual license, and provides a digital content. In the following, a digital content in the present embodiment is regarded as a game application (hereinafter, also referred to as a "game AP") enjoyed by a user.

The payment apparatus 14 is an information processing apparatus that is placed in a financial institution or a credit card company and settles the payment of a new purchase fee or a renewal fee of a group license using a means of payment, such as an account transfer and a credit card transaction. Upon receiving from the content distribution server 10 a request for settling the payment of a new purchase fee or a renewal fee of a group license, the payment apparatus 14 settles the payment; when the settlement is normally completed, the payment apparatus 14 transmits information indicating the completed settlement to the content distribution server 10.

A portable game terminal 12 is an information processing terminal with which a user can enjoy a game and performs processing of a game AP according to a user's operation. The portable game terminal 12 can be carried by a user and is connected to or disconnected from the content distribution server 10 as needed. Also, the portable game terminal 12 manages the execution data of a game AP provided by the content distribution server 10 and the individual license for the game AP.

Figure 2:
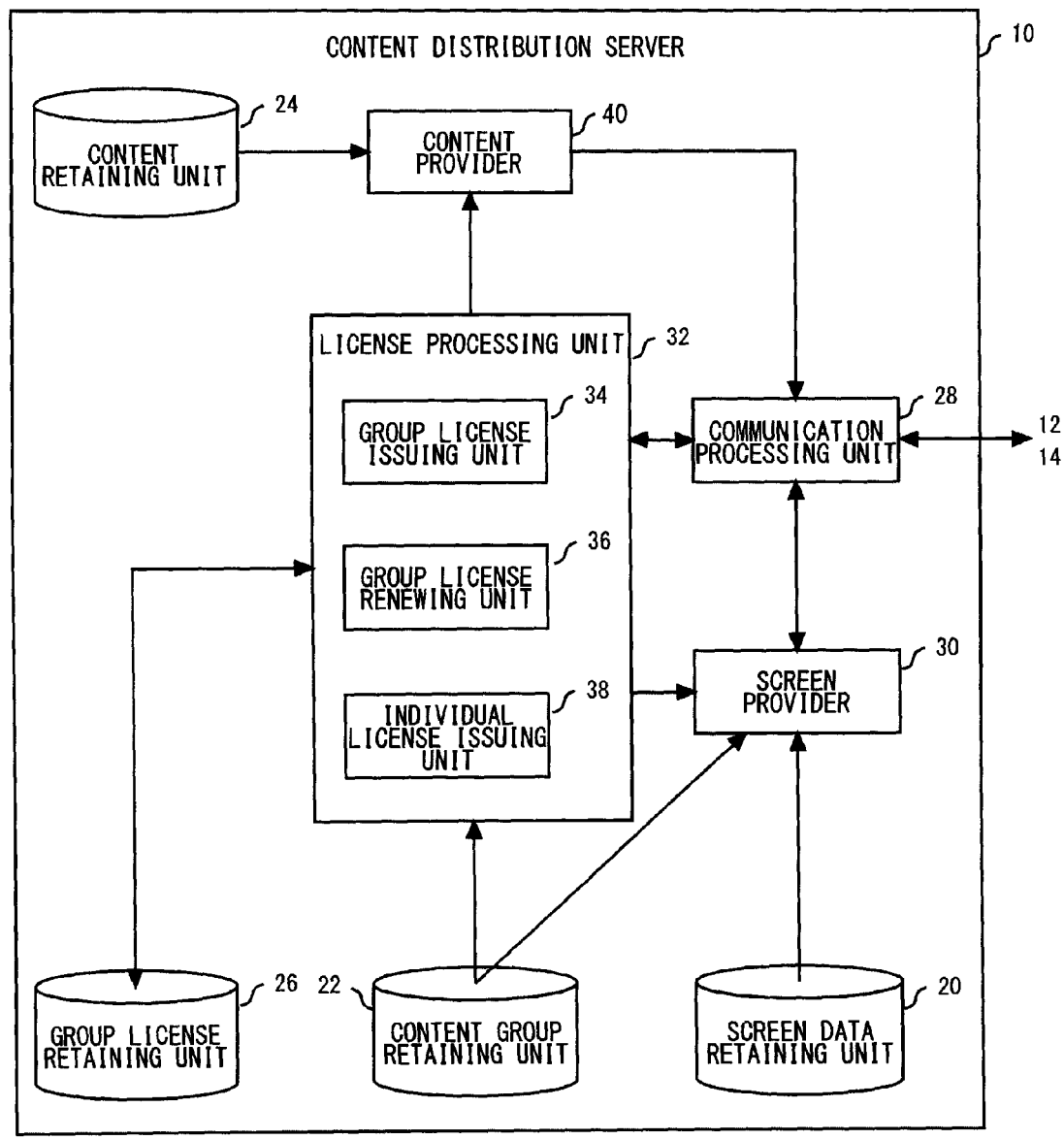
FIG. 2 is a block diagram that shows a functional configuration of a content distribution server shown in FIG. 1.

FIG. 2 is a block diagram that shows a functional configuration of the content distribution server 10 shown in FIG. 1. The content distribution server 10 comprises a screen data retaining unit 20, a content group retaining unit 22, a content retaining unit 24, a group license retaining unit 26, a communication processing unit 28, a screen provider 30, a license processing unit 32, and a content provider 40.

Each block shown in a block diagram in this specification can be implemented by an element such as a CPU or memory of a computer or by a mechanism in terms of hardware, and by a computer program or the like in terms of software. FIG. 2 illustrates functional blocks implemented by the cooperation of those components. Therefore, it will be obvious to those skilled in the art that the functional blocks may be implemented in a variety of forms by combinations of hardware and software. For example, each functional block in FIG. 2 may be installed in the hard disk of the content distribution server 10 as software and may be read into a memory to be executed by a processor, as needed. Alternatively, each functional block may be provided in an electronic circuit as hardware. The same definition will be applied to another block diagram described later.

The screen data retaining unit 20 is a storage area for retaining screen data for displaying a screen of an online store on a portable game terminal 12. The content group retaining unit 22 is a storage area for retaining a content group table that contains data of a content group. The content retaining unit 24 is a storage area for retaining the execution data of a game AP with which a portable game terminal 12 executes the game AP. The group license retaining unit 26 is a storage area for retaining a group license table that contains data of a group license issued to a portable game terminal 12.

FIG. 3 shows a configuration of a content group table. A content group ID field specifies the ID of a content group, and a content ID field specifies the ID of a game AP included in a content group. For example, 10 to 30 titles of game APs may be related to one content group. A concurrently permissible number field specifies the maximum number of valid individual licenses, i.e., individual licenses of which the license periods have not terminated, permissible within a license period of a group license. The concurrently permissible number "3" means that up to three individual licenses of which the license periods have not terminated are permitted at the same time. A fee field specifies a new purchase fee or a renewal fee of a group license. A period field specifies the length of a license period. The period "30 days" means that a group license need be renewed 30 days after a new purchase or a renewal of the group license.

FIG. 4 shows a configuration of a group license table. A user ID field specifies the ID of a user to whom a group license has been issued. For example, a user ID may be a login ID used when the user logs in the online store. A content group ID field specifies the ID of a group license issued to a user, which is identical with the ID of the content group in the present embodiment. A group starting date and time field specifies the date and time when a license period of a group license starts, and a group ending date and time field specifies the date and time when a license period of a group license terminates. In the present embodiment, a group starting date and time is set to the date and time when the payment of the new purchase fee of a group license is settled. Also, a group ending date and time is set to the date and time obtained by adding a license period of a group license, such as 30 days, to a group starting date and time.

A content ID field in FIG. 4 specifies the ID of a game AP downloaded by a user, i.e., a game AP for which the individual license has been issued to the user, among game APs included in a content group. An individual starting date and time field specifies the date and time when a license period of an individual license starts, and an individual ending date and time field specifies the date and time when a license period of an individual license terminates. In the present embodiment, an individual starting date and time is set to the date and time when an individual license is issued to a user, i.e., the date and time when the execution data of a game AP is transmitted to a portable game terminal 12. Also, an individual ending date and time is set to the date and time obtained by adding a predetermined grace period to a group ending date and time.

The grace period is a period during which a user should renew an individual license after renewing a group license, and the execution of the game AP is permitted during the grace period. The user may renew the individual license for a game AP if the user wishes to continue the use thereof, and the user need not renew the individual license for a game AP if the user wishes to stop the use thereof. The grace period is set to four days in the present embodiment, but it may be set to an appropriate length of period obtained through corporate knowledge or experiments using the content distribution system 100.

The description now returns to FIG. 2, and the communication processing unit 28 performs communication processing between the content distribution server 10 and a portable game terminal 12 or between the content distribution server 10 and payment apparatus 14 via the communication network 16. The screen provider 30, license processing unit 32, and content provider 40, which will be described later, transmit data to or receive data from an external apparatus via the communication network 16.

The screen provider 30 transmits screen data of the online store to a portable game terminal 12. The screens of the online store include screens providing various pieces of information for inviting users to use the subscription service. For example, there is included a content group information screen that provides information of content groups so as to allow a user to select a group license to purchase. Also, there is included a game AP information screen that provides information of game APs so as to allow a user to select a game AP to download.

The license processing unit 32 performs various data processes regarding a group license and an individual license. The license processing unit 32 includes a group license issuing unit 34, a group license renewing unit 36, and an individual license issuing unit 38.

The group license issuing unit 34 receives, from a user's portable game terminal 12, data indicating a new purchase of a group license of which the ID is specified therein. The group license issuing unit 34 then transmits, to the payment apparatus 14, data for settling the payment of the new purchase fee of the group license. Upon receiving from the payment apparatus 14 a notification that the settlement has been normally completed, the group license issuing unit 34 performs the issuing process of the group license for the user by recording, in the group license table, the information of the group license related to the user. For example, the group license issuing unit 34 specifies the user ID, content group ID, group starting date and time, and group ending date and time in FIG. 4.

The group license issuing unit 34 also receives, from the portable game terminal 12, information required in the future to settle the payment of a renewal fee of the group license and transmits the information to the payment apparatus 14. Thereafter, the payment of a renewal fee of the group license will be automatically settled, so that the group license will be automatically renewed.

The group license renewing unit 36 receives from the payment apparatus 14 a notification that the payment of a renewal fee of a group license already issued to a user has been normally settled. The group license renewing unit 36 then performs renewal processing of the group license by extending the group ending date and time of a record related to the user in the group license table. For example, in the record related to the user B in FIG. 4, the content group "basic pack 3", of which a license period is 30 days, is renewed on September 30, and the group ending date and time thereof is extended to October 30, accordingly.

The individual license issuing unit 38 receives, from a user's portable game terminal 12, data indicating downloading of a game AP of which the ID is specified therein. The individual license issuing unit 38 then refers to the content group table and group license table to determine whether or not to permit the downloading of the specified game AP. More specifically, if the specified game AP is covered by a group license already issued to the user, and if the current time is included in the license period of the group license, and, in addition, if the number of valid individual licenses already issued to the user is less than the concurrently permissible number, the individual license issuing unit 38 will permit the downloading of the game AP.

When permitting downloading of a game AP, the individual license issuing unit 38 performs the issuing process of the individual license for the user by adding the information of the individual license to the information of the group license related to the user. For example, the individual license issuing unit 38 newly specifies the content ID, individual starting date and time, and individual ending date and time in FIG. 4. The individual license issuing unit 38 of the present embodiment sets an individual ending date and time associated with a group ending date and time to the date and time obtained by adding a predetermined grace period to the group ending date and time. The individual license issuing unit 38 also transmits to a portable game terminal 12 the information of an individual license, such as the content ID, individual ending date and time, and group ending date and time. Further, the individual license issuing unit 38 transmits to the content provider 40 an instruction to transmit a game AP specified by a user.

Upon receiving from the individual license issuing unit 38 an instruction to transmit a game AP, the content provider 40 acquires the execution data of the game AP from the content retaining unit 24 and transmits the data to the portable game terminal 12.

The individual license issuing unit 38 also receives, from a user's portable game terminal 12, data indicating a renewal of an individual license for a game AP of which the ID is specified therein. The individual license issuing unit 38 then refers to the content group table and group license table to determine whether or not to permit the renewal of the individual license for the specified game AP. More specifically, if the specified game AP is covered by a group license already issued to the user, and if the current time is included in the license period of the group license, and, in addition, if the number of the other valid individual licenses already issued to the user is less than the concurrently permissible number, the individual license issuing unit 38 will permit the renewal of the individual license. The number of the other valid individual licenses is obtained by subtracting the individual license for the game AP to be renewed from the total number of valid individual licenses.

When permitting a renewal of an individual license, the individual license issuing unit 38 performs renewal processing of the individual license for the user by extending the individual ending date and time of a record related to the user in the group license table. For example, in the record of "oo golf" related to the user B in FIG. 4, the individual license for "oo golf" is renewed, and the individual ending date and time thereof is extended to the date and time obtained by adding a grace period to the group ending date and time, accordingly. When permitting a renewal of an individual license, the individual license issuing unit 38 also transmits to the portable game terminal 12 the new individual ending date and time set after the renewal of the individual license and the group ending date and time, which are related to the ID of the game AP.

Figure 5:
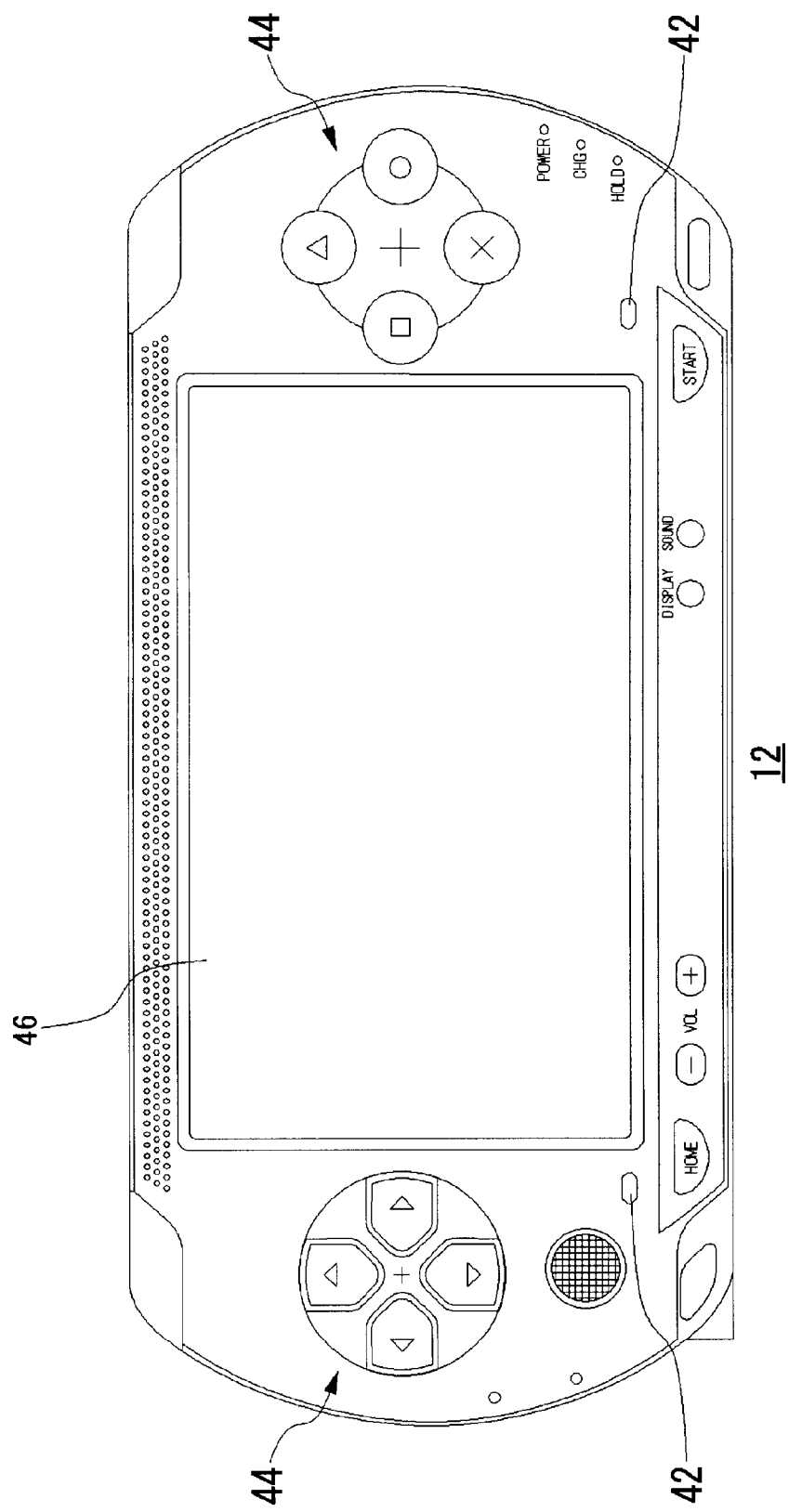
FIG. 5 is a diagram that shows an external configuration of a portable game terminal shown in FIG. 1.

FIG. 5 shows an external configuration of a portable game terminal 12 shown in FIG. 1. The portable game terminal 12 comprises a display 46 for displaying a game image or a graphical user interface, speakers 42 for outputting audio data, and a controller 44 for receiving an operation input from a user. The controller 44 includes a directional key, four kinds of buttons (◯ button, × button, □ button, and △ button), a START button, a SELECT button, a HOME button, etc. provided on the top of the casing, and also includes buttons provided on a side of the casing.

Figures 6, 7:
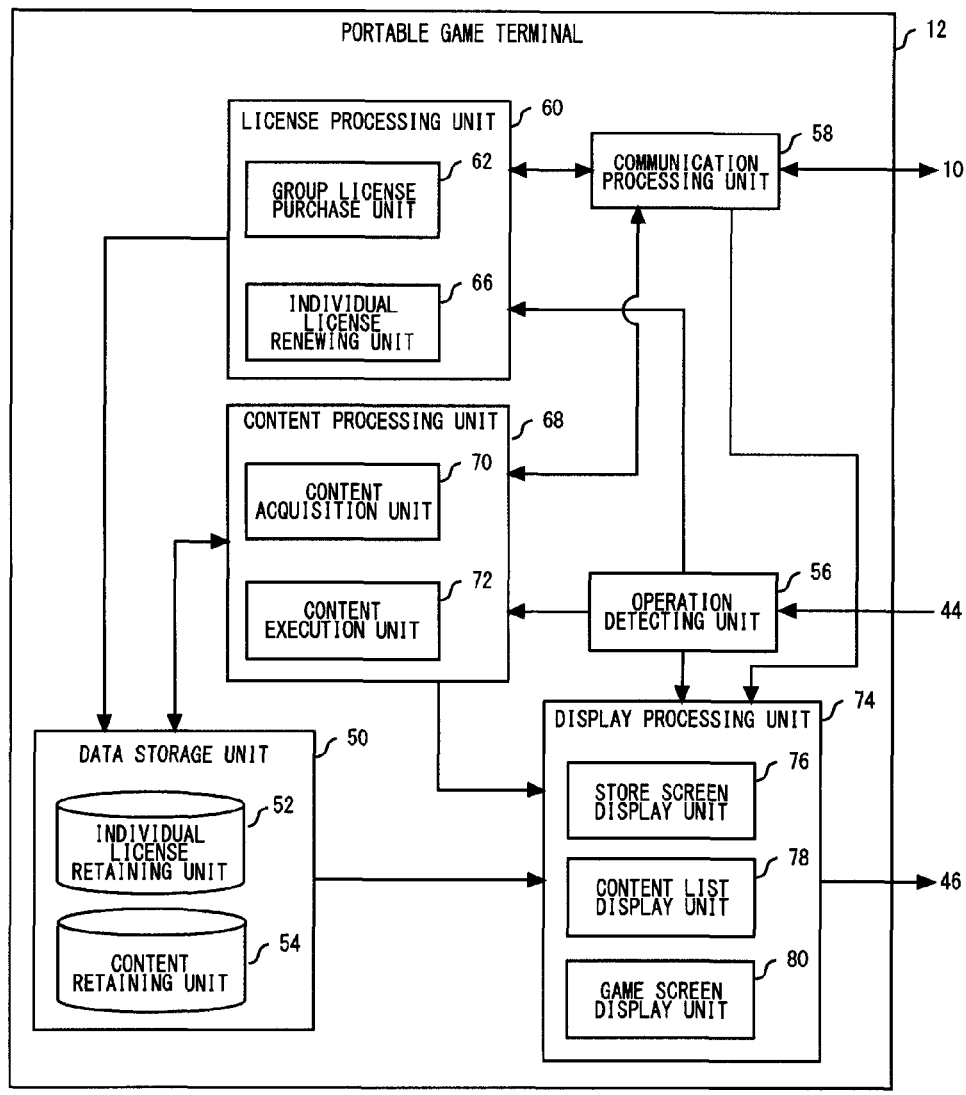
FIG. 6 is a block diagram that shows a functional configuration of a portable game terminal shown in FIG. 1.
FIG. 7 is a diagram that shows a configuration of an individual license table.

FIG. 6 is a block diagram that shows a functional configuration of a portable game terminal 12 shown in FIG. 1. The portable game terminal 12 comprises a data storage unit 50, an operation detecting unit 56, a communication processing unit 58, a license processing unit 60, a content processing unit 68, and a display processing unit 74.

The data storage unit 50 is a storage area for storing various data and includes an individual license retaining unit 52 and a content retaining unit 54. The individual license retaining unit 52 retains an individual license table that contains data of an individual license. FIG. 7 shows a configuration of the individual license table. The individual license table contains a record in which a content ID, an individual ending date and time, and a group ending date and time are related to each other. Referring back to FIG. 6, the content retaining unit 54 retains the execution data of a game AP. The content retaining unit 54 also retains a thumbnail image, which is a reduced image for suggesting the content of a game AP.

The operation detecting unit 56 detects the kind of operation made by a user to the controller 44. The license processing unit 60, content processing unit 68, and display processing unit 74, which will be described later, acquire the kind of the user's operation from the operation detecting unit 56 and determine the details of the user's instruction according to the kind of operation. The communication processing unit 58 performs communication processing between the portable game terminal 12 and content distribution server 10 via the communication network 16. The license processing unit 60, content processing unit 68, and display processing unit 74 described later transmit data to or receive data from the content distribution server 10 via the communication processing unit 58.

The license processing unit 60 performs data processing associated with a license and includes a group license purchase unit 62 and an individual license renewing unit 66. When receiving a user's instruction to purchase a given group license, the group license purchase unit 62 transmits, to the content distribution server 10, data indicating a new purchase of the group license of which the ID is specified therein. Such data includes various pieces of information required to purchase a group license, such as a user's credit card number. Also, as mentioned previously, various pieces of information required for automatic renewal of the group license are transmitted at the time.

When receiving a user's instruction to renew an individual license for a given game AP, the individual license renewing unit 66 transmits, to the content distribution server 10, data that indicates a renewal of the individual license and specifies the ID of the game AP. The individual license renewing unit 66 receives, as information indicating that the individual license has been renewed, the ID of the game AP, the individual ending date and time after the renewal, and the group ending date and time after the renewal from the content distribution server 10 and updates the corresponding record in the individual license table accordingly.

The content processing unit 68 performs data processing associated with a game AP and includes a content acquisition unit 70 and a content execution unit 72. When receiving a user's instruction to download a given game AP, the content acquisition unit 70 transmits, to the content distribution server 10, data for requesting downloading of the game AP of which the ID is specified therein. The content acquisition unit 70 then receives the information of the individual license for the game AP from the content distribution server 10 and stores the information in the individual license table. The content acquisition unit 70 also receives the execution data of the game AP from the content distribution server 10 and stores the data in the content retaining unit 54.

When receiving a user's instruction to execute a given game AP, the content execution unit 72 refers to the individual license table to determine if the license period of the game AP is specified, i.e., if the use of the game AP is permitted by the subscription service. If the license period of the game AP is not specified, the content execution unit 72 determines that the user is permanently entitled to use the game AP and initiates the execution of the game AP. Accordingly, the content execution unit 72 acquires the execution data of the game AP from the content retaining unit 54 and performs data processing as needed. When a game image or a message need be displayed on the display 46, the content execution unit 72 transmits a display instruction including data for screen display to a game screen display unit 80, which will be described later.

If the license period of the game AP is specified, on the other hand, the content execution unit 72 further determines if the current time is included in the license period of the individual license, i.e., if the individual ending date and time has already passed. If the individual ending date and time has already passed, the content execution unit 72 displays on the display 46 a message for requesting the user to renew the individual license for the game AP and cancels the execution of the game AP.

If the individual ending date and time has not passed yet, the content execution unit 72 initiates the execution of the game AP. Also, if it is within the grace period at the time, the content execution unit 72 displays on the display 46 a message for prompting a renewal of the individual license for the game AP when initiating the execution of the game AP. With reference to the individual license table, if the group ending date and time has already passed but the individual ending date and time has not passed yet, the content execution unit 72 determines that it is within the grace period at the time.

The display processing unit 74 provides display control to the display 46 and includes a store screen display unit 76, a content list display unit 78, and a game screen display unit 80. The game screen display unit 80 displays a game image or message on the display 46 according to a display instruction received from the content execution unit 72. The store screen display unit 76 displays information provided by the online store on the display 46 according to screen data of the online store received from the content distribution server 10.

The content list display unit 78 displays on the display 46 a content list screen showing a list of game APs retained in the content retaining unit 54. The content list display unit 78 acquires a thumbnail image corresponding to each game AP from the content retaining unit 54 and displays the thumbnail image on the content list screen.

Figure 8:
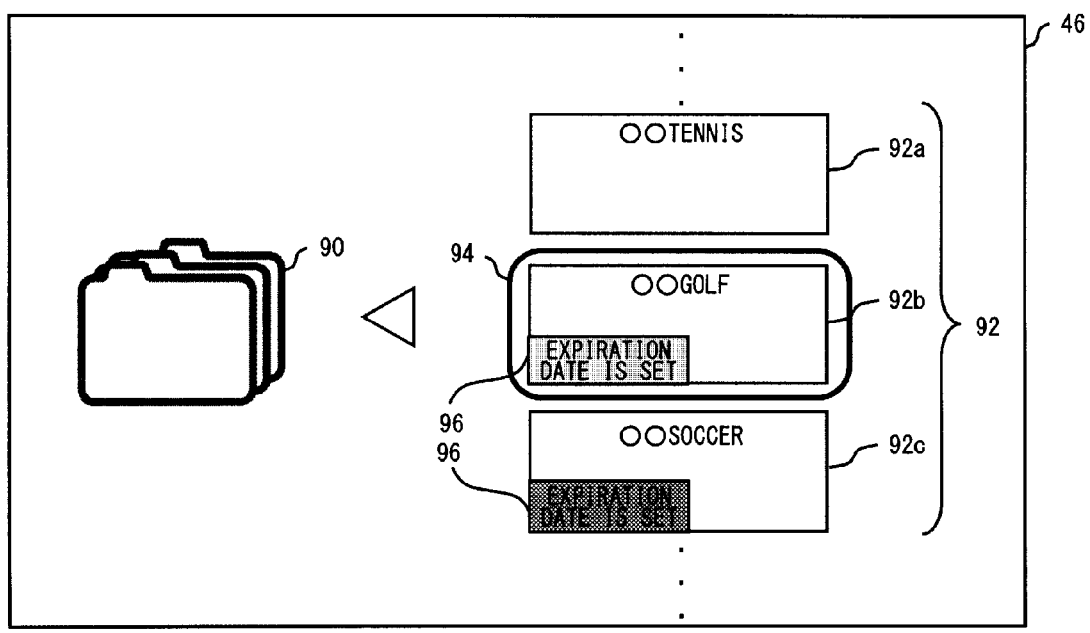
FIG. 8 is a diagram that shows an image of a content list screen.

FIG. 8 shows an image of the content list screen. A game folder image 90 indicates a folder containing game APs, and, when the user selects a game folder image 90, thumbnail images 92 that each correspond to each of multiple game APs are displayed. In FIG. 8, a first thumbnail image 92a, a second thumbnail image 92b, and a third thumbnail image 92c are shown as the thumbnail images 92. When the user moves a focus object 94 onto the thumbnail image 92 of a game AP that the user wishes to start so as to order the initiation of the execution thereof, the execution of the game AP corresponding to the thumbnail image 92 is initiated.

When displaying the content list screen, the content list display unit 78 refers to the individual license table and, if there is a game AP of which the license period is specified, the content list display unit 78 will display a remaining period indicator 96 in association with the thumbnail image 92 of the game AP. The remaining period indicator 96 is an image for indicating the remaining period of a license period. In FIG. 8, the remaining period indicators 96 are superimposed and displayed on the second thumbnail image 92b and third thumbnail image 92c, which means that the license periods are specified for these game APs. Meanwhile, the remaining period indicator 96 is not displayed on the first thumbnail image 92a, which means that this game AP is a permanently available content.

The content list display unit 78 determines the display mode of the remaining period indicator 96 according to the relationship between the current time and the license period of the individual license. For example, if there is enough time in the license period, i.e., if both the group ending date and time and the individual ending date and time have not passed yet, a certain display mode may be selected. If it is within the grace period in which the individual license should be renewed, i.e. if the group ending date and time has already passed but the individual ending date and time has not passed yet, another display mode may be selected. If the individual license has expired, i.e., if both the group ending date and time and the individual ending date and time have already passed, yet another display mode may be selected.

Thus, with the remaining period indicator 96 displayed on the screen, a user can intuitively grasp the remaining period during which the user can use a game AP permitted by the subscription service. For example, a user can check the display modes of the remaining period indicators 96 to decide the priorities of multiple game APs to play.

In the following, the operation performed by the configuration set forth above will be described.

Figure 9:
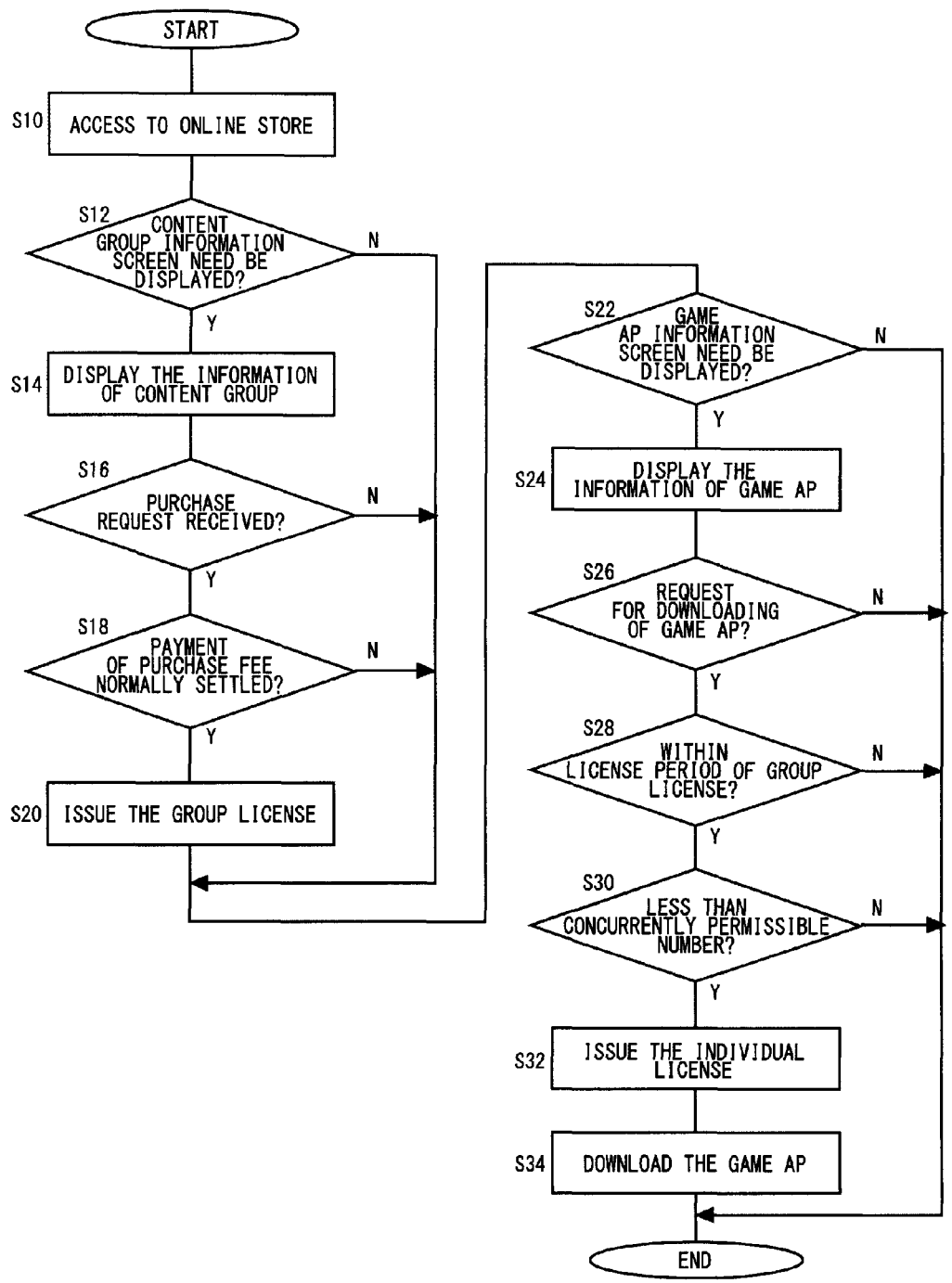
FIG. 9 is a flowchart that shows the operation for issuing a license in the content distribution system.

FIG. 9 is a flowchart that shows the operation for issuing a license in the content distribution system 100. A portable game terminal 12 accesses the website of an online store provided by the content distribution server (S10). If the user requests the content group information screen on the website of the online store (Y at S12), the screen provider 30 of the content distribution server 10 will transmit explanatory information about a content group to the portable game terminal 12. Accordingly, the store screen display unit 76 of the portable game terminal 12 will display the explanatory information about the content group on the display 46 (S14).

If the group license purchase unit 62 of the portable game terminal 12 receives a request for a new purchase of a group license from a user (Y at S16), the group license purchase unit 62 will transmit the request to the content distribution server 10. If the payment apparatus 14 normally settles the payment of the new purchase fee of the group license (Y at S18), the group license issuing unit 34 of the content distribution server 10 will issue the group license to the user and store the information of the group license in the group license retaining unit 26 (S20). If the payment apparatus 14 does not normally settle the payment of the purchase fee (N at S18), the process of S20 will be skipped. Also, if there is no request for a purchase of a group license (N at S16), the processes of S18 and S20 will be skipped. Further, if there is no request for displaying the content group information screen (N at S12), the processes of S14 through S20 will be skipped.

If the user requests the game AP information screen on the website of the online store (Y at S22), the screen provider 30 of the content distribution server 10 will transmit explanatory information about a game AP to the portable game terminal 12. Accordingly, the store screen display unit 76 of the portable game terminal 12 will display the explanatory information about the game AP on the display 46 (S24). If the content acquisition unit 70 of the portable game terminal 12 receives a request for downloading a game AP from a user (Y at S26), the content acquisition unit 70 will transmit the request to the content distribution server 10. If it is within the license period of the related group license at the time (Y at S28) and if the number of valid individual licenses is less than the concurrently permissible number of the group license (Y at S30), the individual license issuing unit 38 of the content distribution server 10 will issue an individual license, transmit the information of the individual license to the portable game terminal 12, and reflect the information in the group license retaining unit 26 (S32).

After an individual license is issued, the content provider 40 transmits to the portable game terminal 12 the execution data of the game AP to be downloaded (S34). If the number of valid individual licenses has reached the concurrently permissible number of the group license (N at S30), the processes of S32 and S34 will be skipped. If the license period of the group license has terminated (N at S28), the processes of S30 through S34 will be skipped. Also, if there is no request for downloading a game AP (N at S26), the processes of S28 through S34 will be skipped. Further, if there is no request for displaying the game AP information screen (N at S22), the processes of S24 through S34 will be skipped.

Figure 10:
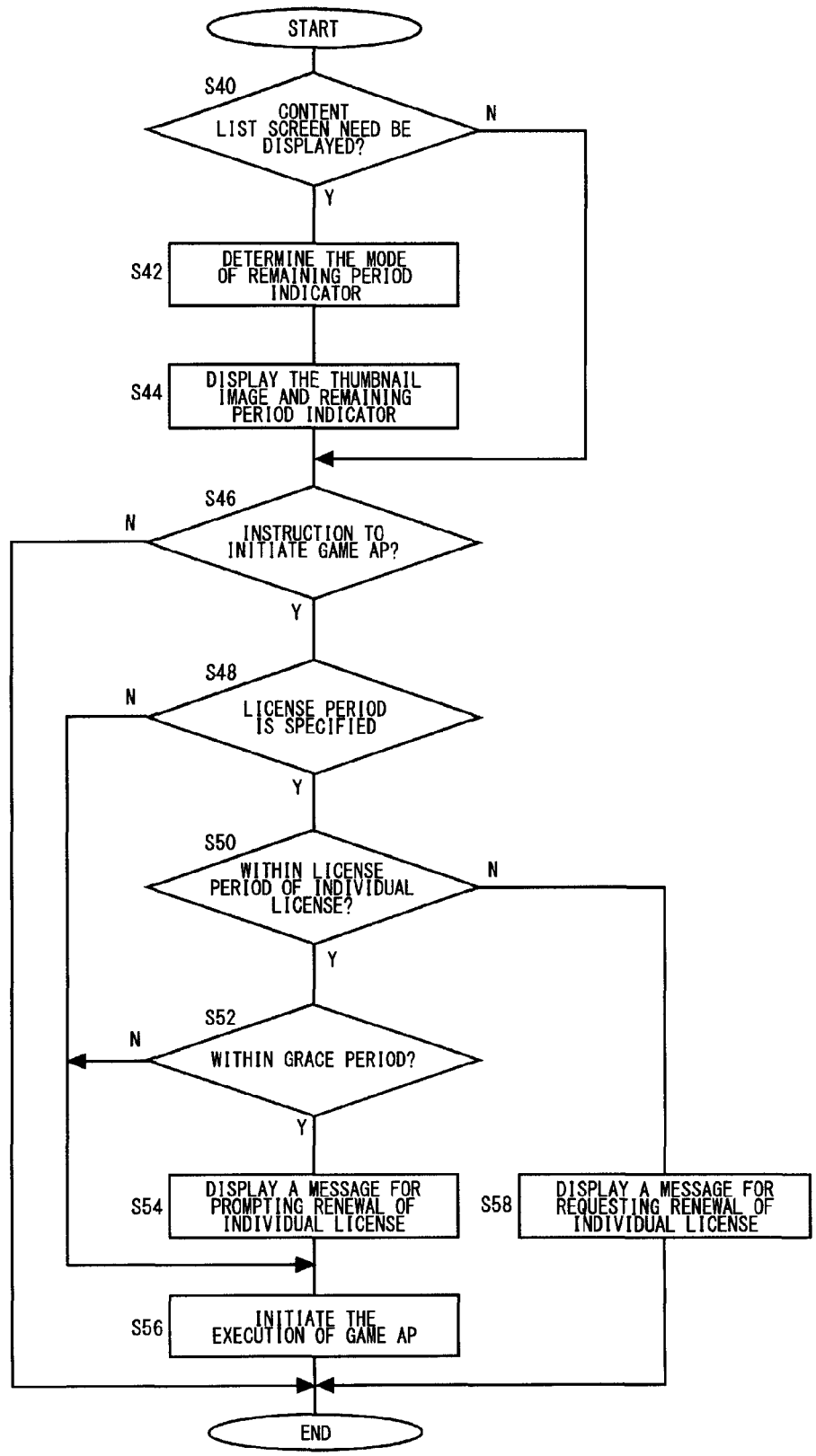
FIG. 10 is a flowchart that shows the operation for executing a game AP in a portable game terminal.

FIG. 10 is a flowchart that shows the operation for executing a game AP in a portable game terminal 12. If the content list display unit 78 receives a request for displaying the content list screen from a user (Y at S40), the content list display unit 78 will determine the display mode of the remaining period indicator for a game AP retained in the portable game terminal 12 according to the remaining time of the license period of the individual license for the game AP (S42). The content list display unit 78 will then display on the content list screen the thumbnail image of the game AP and the remaining period indicator for the game AP so as to be related to each other (S44). If there is no request for displaying the content list screen (N at S40), the processes of S42 and S44 will be skipped.

If the content execution unit 72 receives a request for initiating a game AP from a user (Y at S46) and if no license period is specified for the game AP (N at S48), the content execution unit 72 will immediately initiate the execution of the game AP (S56). If a license period is specified for the game AP (Y at S48) and if it is within the license period (Y at S50) and also within the grace period (Y at S52) at the time, the content execution unit 72 will display a message for prompting a renewal of the individual license on the display 46 (S54) before initiating the execution of the game AP (S56). If it is not within the grace period (N at S52), the process of S54 will be skipped. If the license period of the game AP has terminated (N at S50), the content execution unit 72 will display a message for requesting a renewal of the individual license (S58) and the process of the flowchart in FIG. 10 will terminate there without initiating the execution of the game AP. If there is no request for initiating a game AP (N at S46), the subsequent processes will be skipped and the process of the flowchart in FIG. 10 will terminate there.

Figure 11:
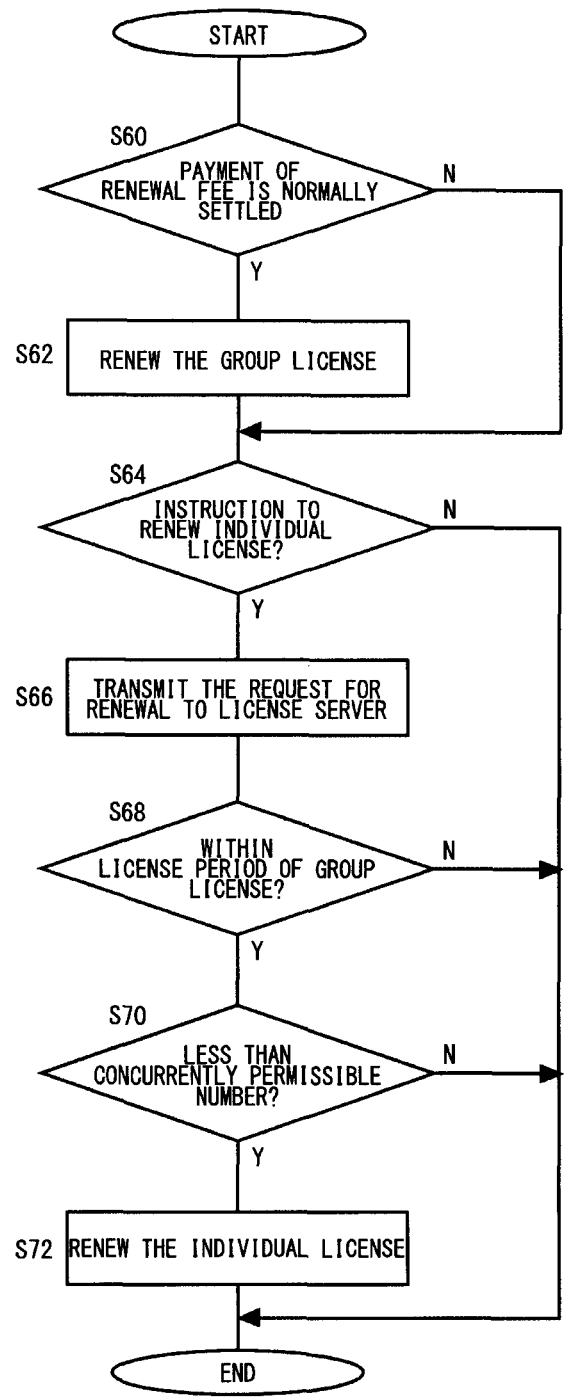
FIG. 11 is a flowchart that shows the operation for renewing a license in the content distribution system.

FIG. 11 is a flowchart that shows the operation for renewing a license in the content distribution system 100. If the payment apparatus 14 normally settles the payment of a renewal fee of a group license (Y at S60), the group license renewing unit 36 of the content distribution server 10 will extend the end point of the license period of the group license (S62). If the payment apparatus 14 does not normally settle the payment of a renewal fee of a group license (N at S60), the process of S62 will be skipped.

If the individual license renewing unit 66 of the portable game terminal 12 receives a request for renewing an individual license from a user (Y at S64), the individual license renewing unit 66 will transmit the request to the content distribution server 10 (S66). If it is within the license period of the group license for the individual license at the time (Y at S68) and if the number of the other valid individual licenses is less than the concurrently permissible number of the group license (Y at S70), the individual license issuing unit 38 of the content distribution server 10 will extend the end point of the license period of the individual license and notify the portable game terminal 12 of the new end point (S72). If the number of the other valid individual licenses has reached the concurrently permissible number of the group license (N at S70), the process of S72 will be skipped. If the license period of the group license has terminated (N at S68), the processes of S70 and S72 will be skipped. In this case, a message for requesting the user to renew the group license may be displayed on the screen of the online store. If there is no request for renewing an individual license (N at S64), the processes of S66 through S72 will be skipped.

Figure 12:
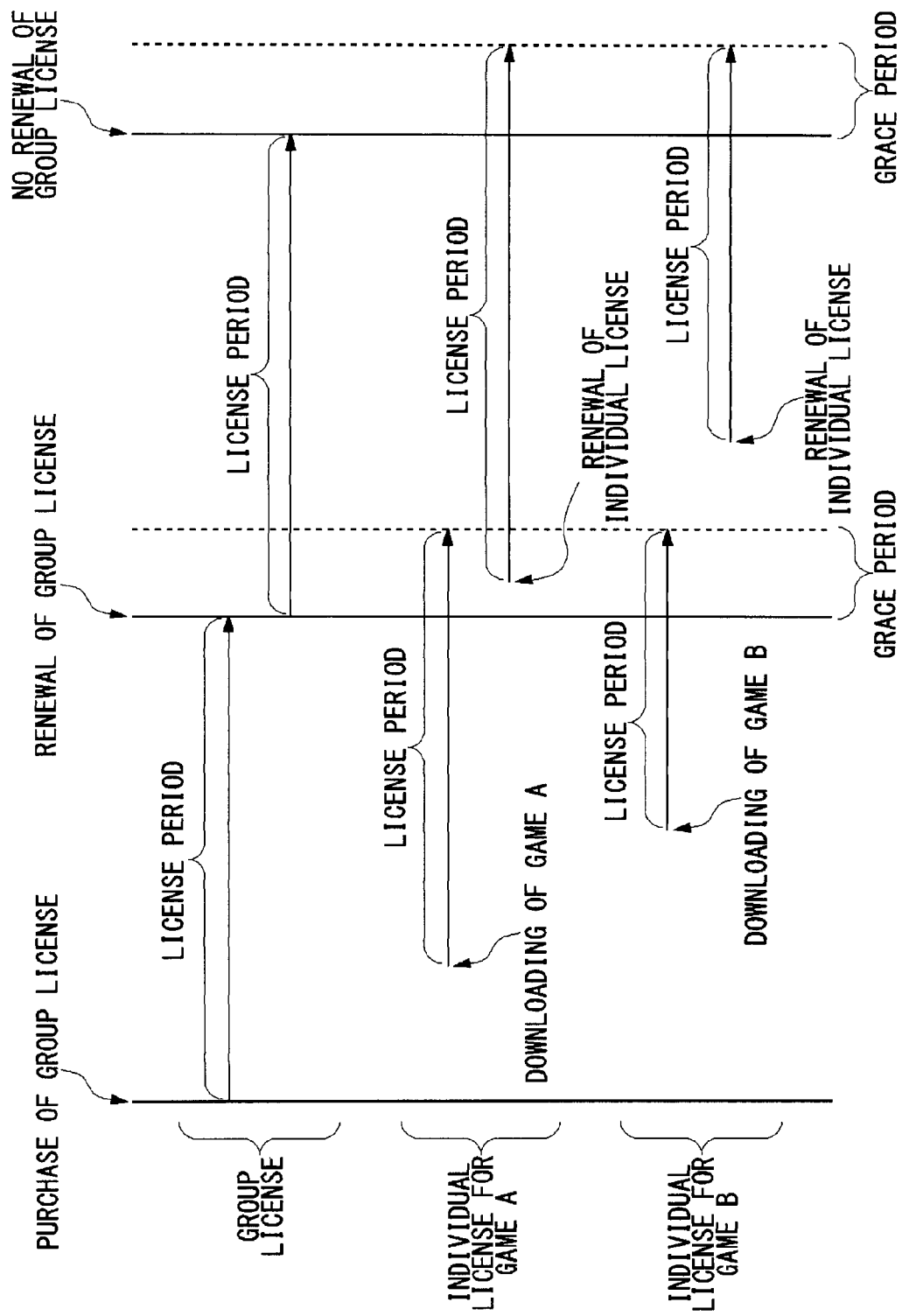
FIG. 12 is a diagram that shows an image of a license period specified by each license in the present embodiment.

FIG. 12 shows an image of a license period specified by each license in the present embodiment. For a group license, a predetermined length of license period is specified, triggered by the purchase of the license. Also, another license period of the same length is specified for the group license triggered by a renewal of the license. For an individual license, a license period is specified for a game A in FIG. 12 triggered by the downloading of the game AP, in which the end point of the license period is set to the date and time obtained by adding a grace period to the end point of the license period of the group license, and the individual license is renewed within the grace period and the use of the game AP is continuously permitted. Meanwhile, with regard to a game B, since the individual license therefor is not renewed within the grace period, the use of the game AP is once forbidden and then permitted again after the individual license is renewed.

Thus, the content distribution system 100 of the present embodiment enables a subscription service that allows a user to select and enjoy a desired game AP from among multiple game APs. The subscription service provides a user with the benefit of enjoying a desired game AP inexpensively. The subscription service also provides a seller of a game AP with the benefit of obtaining steady income from the game AP by providing the game AP through the service. When a game AP is sold in a general manner, sales of the game AP may be significant immediately after its release but then may sharply decrease as time elapses. According to the present embodiment, on the other hand, a seller of a game AP can expect an income from the game AP for a relatively long period by providing the game AP through the subscription service. Also, by providing a game AP of which sales is stabilized through the subscription service, the stimulation of new demand can be expected.

In the content distribution system 100, a group license for which a subscription service fee is charged is managed by the content distribution server 10, and an individual license by which the permission for initiation of an individual game AP is determined is managed by a portable game terminal 12. Also, the end point of a license period of an individual license is set to a date and time according to the license period specified by the related group license. Accordingly, even when the portable game terminal 12 is not connected to the network, the portable game terminal 12 appropriately determines whether or not to initiate a game AP. This is a great advantage especially for a portable game terminal carried by a user and improves the convenience of the subscription service. In addition, this advantage can prevent a possible problem in the case where licenses are collectively managed by the center, i.e., the problem that a game AP can be continuously used even after the license period therefor terminates as long as the portable game terminal 12 remains disconnected from the network.

Also, in the content distribution system 100, a group license is automatically renewed, while an individual license is renewed upon an explicit request by a user. Accordingly, when using the subscription service, the user can concentrate on the selection of a game AP without regard to the payment of the service fee. Also, since the speed of getting tired of a game AP or completing the game of a game AP is different from user to user, the period for which each user desires to use a game AP is also different. By setting a user's explicit request as a condition for a renewal of an individual license, the user's unwilling continuous use of a game AP will hardly occur, thereby improving the convenience of the subscription service.

In the content distribution system 100, the end point of a license period of an individual license is set by adding a grace period to the end point of the license period of the related group license. Accordingly, since the end point of the license period of the individual license comes later, permission to extend the individual license may be withheld if the group license has not been renewed to extend the end point. In other words, the situation can be prevented in which a user is permitted to use a game AP longer than the period that the user has paid the fee for.

Also, by prompting a user to renew an individual license during the grace period, an unanticipated situation for the user, such as being unable to activate a game AP at some point, can be prevented. Even after the license period of an individual license has once terminated, the game AP can be activated again if the individual license is renewed, as shown in FIG. 12. However, since a portable game terminal 12 may not necessarily be connected to the network, the renewing process of an individual license may be sometimes impossible. Therefore, prompting a renewal of an individual license provides a great benefit to the user.

The present invention has been described with reference to the embodiment. The embodiment is intended to be illustrative only, and it will be obvious to those skilled in the art that various modifications to constituting elements or processes could be developed and that such modifications also fall within the scope of the present invention.

In the aforementioned embodiment, the individual license issuing unit 38 of the content distribution server 10 sets the end point of a license period of an individual license to the date and time obtained by adding a grace period to the end point of the license period of the related group license. In a modification, the end point of a license period of an individual license may be set to the same date and time as the end point of the license period of the related group license. In such a case, the portable game terminal 12 sets a predetermined grace period, for which the use of the game AP is permitted, after the license period of the individual license. Accordingly, when receiving a request for initiating a game AP from a user, if a license period is specified for the game AP and if it is within the license period at the time, the content execution unit 72 of the portable game terminal 12 will immediately initiate the execution of the game AP. If it is within the predetermined grace period after the license period at the time, the content execution unit 72 will display a message for prompting a renewal of the individual license before initiating the execution of the game AP. If the grace period has already terminated, the content execution unit 72 will display a message for requesting a renewal of the individual license but will not initiate the execution of the game AP.

The user is provided with a grace period to renew an individual license also in this modification, and hence, the modification provides the same effects as the embodiment set forth above. In addition, since the processing during the grace period is a closed process using a game AP in the portable game terminal 12 and since the same end point can be set for both a group license and an individual license, license management in the content distribution system 100 can be made simple and the convenience of the management can be improved.

Although the aforementioned embodiment does not particularly refer, if an individual license has expired while the portable game terminal 12 is executing the game AP, the execution of the game AP may be continued until the user terminates the execution. In such a case, when the game AP is to be activated again on the portable game terminal 12, the activation may be forbidden.

Although the aforementioned embodiment does not particularly refer, if a portable game terminal 12 has a hibernation function and an individual license for a game AP has expired during the execution of the game AP, the execution of the game AP may be continued until the portable game terminal 12 enters into a hibernated state. In such a case, when the portable game terminal 12 returns from the hibernation, the activation of the game AP may be forbidden. Also, if an individual license for a game AP has expired while the portable game terminal 12 is in a hibernated state, the execution of the game AP may be forbidden when the portable game terminal 12 returns from the hibernation.

Although the aforementioned embodiment does not particularly refer, an item for upgrading the subscription service being used may be provided on the online site. For example, an additional pack for upgrading the "basic pack 3" in FIG. 3 to the "value pack 5" may be provided. Accordingly, if the user A shown in the group license table of FIG. 4 purchases the additional pack, the content group ID in the record of the user A may be changed to "value pack 5".

Although the aforementioned embodiment employs game APs as an example of digital contents, another kind of digital contents may be used in a modification. For example, the digital contents may be music contents, video contents, or image contents and may also be various applications including word processing software and spreadsheet software.

In the aforementioned embodiment, portable game terminals are used as information devices of users. However, other information devices capable of executing digital contents may be used in a modification. For example, the information devices may be game consoles, dedicated devices for music contents, or general-purpose PCs.

In the aforementioned embodiment, the content distribution server 10 collectively performs the provision of the online store, management of licenses, and provision of digital contents. However, such functions may be distributed and performed by multiple servers in a modification. For example, the functions may be distributed and performed by an online store providing server, a license management server, and a content providing server.

Optional combinations of the aforementioned embodiments and modifications may also be practiced as additional embodiments of the present invention. Such an additional embodiment provided by a combination has each of the effects of the embodiments and modifications combined.

It will be obvious to those skilled in the art that the function to be achieved by each constituent feature described in the claims may be implemented by each of the constituting elements described in the embodiment or modifications, or by the cooperation of those constituting elements.

REFERENCE SIGNS LIST

10 content distribution server
12 portable game terminal
20 screen data retaining unit
22 content group retaining unit
24 content retaining unit
26 group license retaining unit
28 communication processing unit
30 screen provider
34 group license issuing unit
36 group license renewing unit
38 individual license issuing unit
40 content provider
52 individual license retaining unit
54 content retaining unit
62 group license purchase unit
66 individual license renewing unit
68 content processing unit
70 content acquisition unit
72 content execution unit
74 display processing unit
78 content list display unit
92 thumbnail image
96 remaining period indicator
100 content distribution system

INDUSTRIAL APPLICABILITY

The present invention is applicable to an apparatus for managing a license for a digital content.

The invention claimed is:

1. A content processing system, comprising:
a license management apparatus including a communications unit configured to transmit and receive data over a network; and
a content processing apparatus including a communications unit configured to transmit and receive data over the network such that the content processing apparatus is configured to connect to, and disconnect from the license management apparatus over the network,
the license management apparatus including at least one processor and at least one memory, the at least one memory containing a computer program that is executed by the at least one processor to cause the license management apparatus to implement the following:
a first license retaining unit configured to retain the information of a first license, the first license comprehensively permitting the use of a plurality of digital content items by the content processing apparatus and specifying an end point of a license period for such use; and a second license issuing unit configured to issue a second license to the content processing apparatus, the second license individually permitting the use of a specific digital content item selected by a user of the content processing apparatus from among the plurality of digital content items and specifying the end point of a license period in accordance with the end point of the license period specified by the first license, wherein the second license issuing unit transmits the second license to the content processing apparatus over the network, the content processing apparatus including at least one further processor and at least one further memory, the at least one further memory containing a further computer program that is executed by the at least one further processor to cause the content processing apparatus to implement the following:

a second license retaining unit configured to retain the information of the second license; and a content processing unit configured to determine whether or not to permit the use of the selected digital content item with reference to the license period specified by the second license.

2. The content processing system of claim 1, wherein:

the content processing apparatus further comprises a second license renewing unit configured to make, when the license period specified by the second license should be renewed, a request for a renewal of the second license to the license management apparatus; and the second license issuing unit of the license management apparatus transmits, to the content processing apparatus, information indicating a new license period of the second license upon the condition that it is within the license period specified by the first license at the time.

3. The content processing system of claim 2, wherein:

the license management apparatus further comprises a first license renewing unit configured to renew the license period of the first license when a predetermined condition for continuation is met even if there is no renewal operation by a user; and the second license renewing unit of the content processing apparatus renews the license period of the second license on the condition that there is a renewal operation by a user.

4. The content processing system of claim 3, wherein:

the second license issuing unit of the license management apparatus sets the end point of the license period of the second license to the end point of the license period specified by the first license; and, during a predetermined grace period after the license period of the second license, the content processing unit of the content processing apparatus permits the use of the selected digital content and allows a predetermined output apparatus to output a message for prompting a user to perform the renewal operation.

5. The content processing system of claim 3, wherein:

the second license issuing unit of the license management apparatus sets the end point of the license period of the second license to the date and time obtained by adding a predetermined grace period to the end point of the license period specified by the first license; and, when permitting the use of the selected digital content during the grace period, the content processing unit of the content processing apparatus allows a predetermined output apparatus to output a message for prompting a user to perform the renewal operation.

6. The content processing system of claim 1, wherein the second license issuing unit of the license management apparatus permits the issuance of a new second license during the license period specified by the first license until the total number of second licenses of which the license periods have not terminated reaches a predetermined number.

7. The content processing system of claim 1, wherein the content processing apparatus further comprises a display processing unit configured to display on a predetermined display apparatus a reduced image suggesting the content of the selected digital content and also display, in such a manner as to be related to the reduced image, an object image in a mode commensurate with the remaining period of the license period specified by the second license.

* * * * *